United States Patent [19]
Bergemann et al.

[11] 3,805,577
[45] Apr. 23, 1974

[54] EJECTOR ASSEMBLY FOR FORMING MACHINE

[75] Inventors: Werner E. Bergemann; William G. Buchanan, both of Rochester, N.Y.

[73] Assignee: The Gleason Works, Rochester, N.Y.

[22] Filed: Nov. 10, 1972

[21] Appl. No.: 305,420

[52] U.S. Cl. .................................. 72/345, 72/427
[51] Int. Cl. ........................................... B21d 45/00
[58] Field of Search ...................... 72/344, 345, 427

[56] References Cited
UNITED STATES PATENTS
3,357,228   12/1967   Harrison et al. .................... 72/344
3,157,111   11/1964   Andersen ............................ 72/427

*Primary Examiner*—Roy Lake
*Assistant Examiner*—R. Daniel Crouse
*Attorney, Agent, or Firm*—Ralph E. Harper

[57] ABSTRACT

The disclosed ejector assembly provides for a very rapid removal of a workpiece from a forming machine by an assembly which includes a pair of ejector members operating through a hydraulic chamber. A first ejector member of the pair is directly linked to a reciprocating portion of the machine so as to follow each forming and return stroke of the machine, and the second ejector member responds to a movement of the first ejector member only during a return stroke of the machine to effect an immediate removal of a workpiece from the machine. A differential rate of travel is provided between the pair of ejector members to provide a gradually increasing clearance between the workpiece and one forming surface of the machine so that the second ejector member can immediately respond to a return stroke of the machine to cause a very rapid separation of the workpiece from a forming surface of the machine.

10 Claims, 9 Drawing Figures

EJECTOR ASSEMBLY FOR FORMING MACHINE

BACKGROUND AND BRIEF DESCRIPTION OF INVENTION

This invention relates to improvements in ejector mechanisms for machines having a capability of forming or shaping a workpiece by imparting a force or blow to the workpiece. More particularly, the invention provides for an improved ejector assembly having a first ejector member directly linked to means for driving such a machine in its forming and return strokes, so as to maintain a timed relationship with operation of the machine, and a second ejector member which is actuated by the first ejector through a common hydraulic chamber, for immediately contacting and separating a workpiece from a forming surface of the machine as the machine starts a return stroke after a forming operation.

Machines for forming or shaping workpieces by imparting a force to the workpiece typically include a first forming means which is reciprocated back and forth so as to be brought into engagement with successive workpieces held in or against a fixed-position second forming means. In the context of this specification, the first forming means will be described as a moving member, such as a ram carrying a punch or other forming device, and the second forming means will be described as including a bolster or bed which carries a die or other device for supporting and shaping a workpiece when the first forming means is brought into engagement with the workpiece. Such machines include, for example, forming presses for producing various gear shapes and forms from hot or cold parts. In addition, machines of this type can be used for increasing the final density of a workpiece to produce a product having desired metallurgical properties or other characteristics.

In the art of forming hot parts in machines of the type described above, it is very important to provide for a rapid separation and removal of each workpiece from the die or whatever forming member is used for containing the workpiece while it is being shaped and worked. Rapid separation is essential to extend the useful life of a die or other forming member by preventing extremes in thermal cycling, and resulting thermal fatigue, of the forming surface which is exposed to the high temperature forming operations. In addition, it is important in operations of this type to provide for ejection of a workpiece which may become jammed or improperly placed in a die, thereby requiring considerable force for its removal from the die or other forming member. Thus, it is preferred that the ejector mechanism include a provision for applying a variable force in accordance with actual requirements of any given ejection operation.

Various attempts have been made to design and build ejector mechanisms which satisfy the above requirement of forming and shaping machines. The prior attempts have varied from purely mechanical arrangements to those which utilize a source of hydraulic power as an assist for actuating an ejector device. Generally, the prior art designs and structures have permitted a somewhat delayed reaction of an ejector mechanism to machine function so as to avoid interference between the part being ejected and forming surfaces which must be separated after a forming operation. For example, it is known to operate an ejector pin with a slave piston and cylinder hydraulically connected, through conduits, to a master piston and cylinder which receives its energy for movement from inertia of a fly wheel operating a return stroke of a press. However, the master-slave piston and cylinder relationships are such that there is a delay between the time a forming operation is completed (and a return stroke of the machine is initiated) and the time at which a workpiece is separated from a forming cavity of the machine. Such an arrangement is not entirely satisfactory for hot forming operations where the speed of removal of a workpiece from a die or other forming surface becomes critical to sustained operation of a machine.

In accordance with the present invention, a machine for forming or shaping a workpiece by imparting a force to the workpiece has a known first forming means which is brought into engagement with the workpiece while the workpiece is held against a known second forming means, and is provided with an ejector assembly which can be installed in either the first or second forming means for rapidly separating and ejecting a workpiece from the forming means in response to movement of the first forming means away from the second forming means. The ejector assembly includes a chamber means, for containing hydraulic fluid supplied from a source, and first and second ejector members which include respective pressure reactive surfaces exposed to hydraulic pressure within the chamber means. The first ejector member is directly linked to a portion of the machine which drives the first forming means toward and away from the second forming means and thus has a path of travel which corresponds to the distance and direction of travel of the first forming means relative to the second forming means. The second ejector member includes means for contacting and moving a workpiece when the first forming means moves away from the second forming means. The second ejector member responds to movement of the first ejector member only in a direction which corresponds to movement of the first forming means away from the second forming means, and the area of the pressure reactive surface of the second ejector member is more than the area of the pressure reactive surface of the first ejector member to thereby provide for a slower rate and a shorter distance of travel for the second ejector member in response to movement of the first ejector member. This relationship allows the second ejector member to effect a substantially immediate separation of a workpiece from the second forming member upon any movement at all of the first forming member away from the second forming member. By providing a differential rate of travel between the first ejector member and the second ejector member, it is possible to develop a necessary clearance between the immediately moving workpiece and the first forming member during a return stroke of the first forming member away from the position of the workpiece. In addition, by providing a common hydraulic chamber between the first and second ejector members, it is possible to substantially reduce response time which otherwise exists in master/slave piston and cylinder arrangements interconnected by conduits.

The improvement of the present invention further includes a hydraulic control circuit having a fluid flow communication with the aforesaid hydraulic chamber and with a source of supply of hydraulic fluid. The control circuit includes means for maintaining a fixed volume of hydraulic fluid within the chamber during a movement of the first forming means away from the second forming means to thereby provide for a differential rate and distance of travel between the first and second ejector members operating within the chamber. A separate fluid flow communication is provided between the hydraulic control circuit and an opposing reactive surface of the second ejector member so that the second ejector member can be rapidly retracted upon completion of an ejection cycle and prior to initiation of a subsequent forming stroke of the machine. This permits rapid reloading of a new workpiece into the second forming surface prior to a return forming stroke of the machine.

In the context of this specification and its claims, any discussion of forming is intended to include the changing of shape or dimensions of a workpiece, the increasing of density of a workpiece, and/or the changing of metallurgical characteristics of a workpiece through the application of pressure thereto. The workpiece itself may comprise a hot or cold part, although the present invention has special application to the needs of forming and ejecting hot parts from forming machines. The workpiece may comprise a previously compacted or heat treated powder metal part which is to be formed to increase its density and to impart a final shape end dimension thereto. References to a forming machine punch are intended to describe any reciprocating work forming means which cooperates with a relatively fixed-position die to impart a force to a workpiece contained within the die. References to a die are intended to include relatively stationary work forming means which cooperate with a punch, as aforesaid, to shape, densify, or otherwise change the characteristics of a workpiece. However, it should be appreciated that a stationary die and moving punch are not critical to a successful application of the ejector mechanism of this invention to a given machine, and relative movement between forming members may be provided in other ways.

These and other features and advantages of the present invention will become apparent in the more detailed description which follows. In that description reference will be made to the accompanying drawings as briefly described below.

DETAILED DESCRIPTION OF INVENTION

Figure 1:
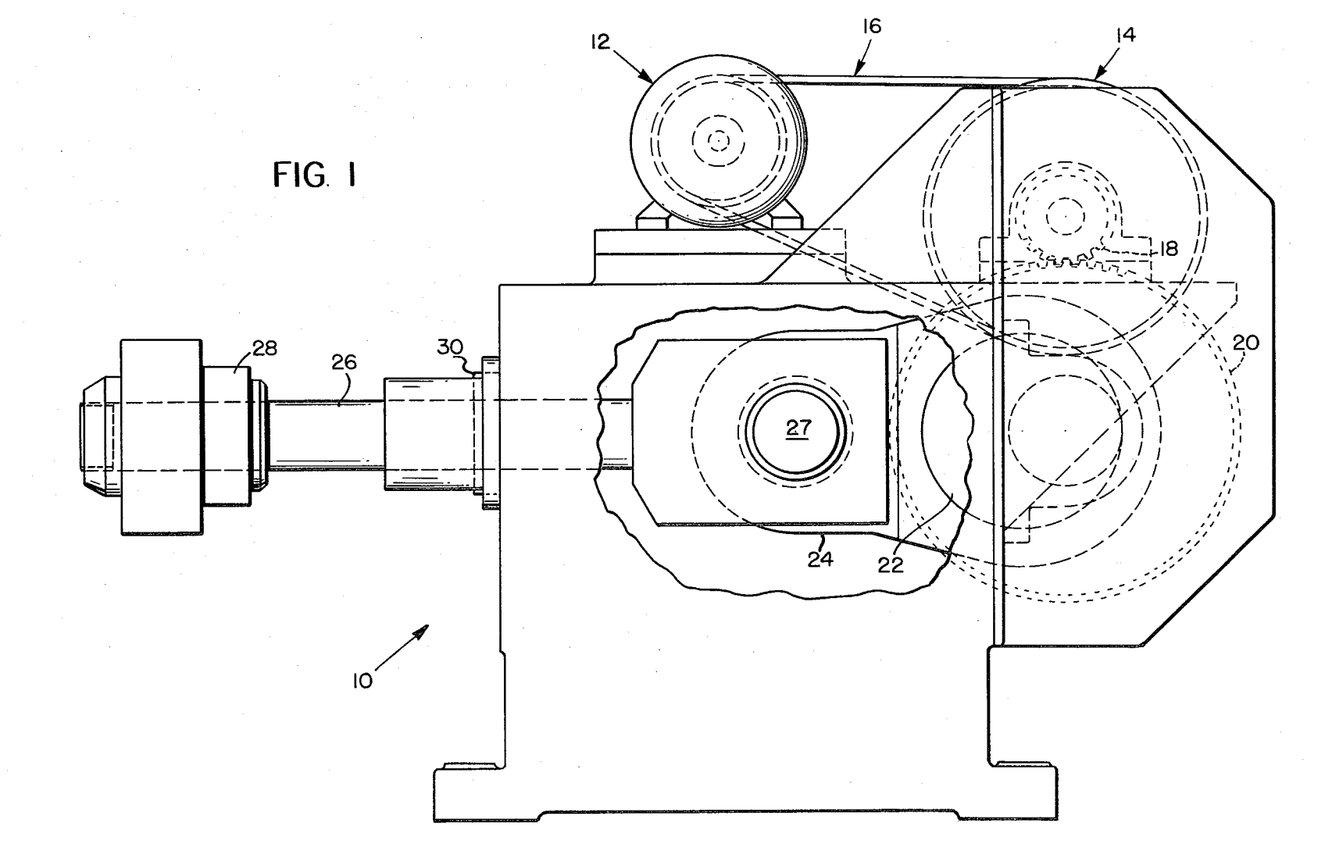
FIG. 1 is a side elevational view of a type of forming machine to which the ejector assembly of the present invention may be applied.
Figure 2:
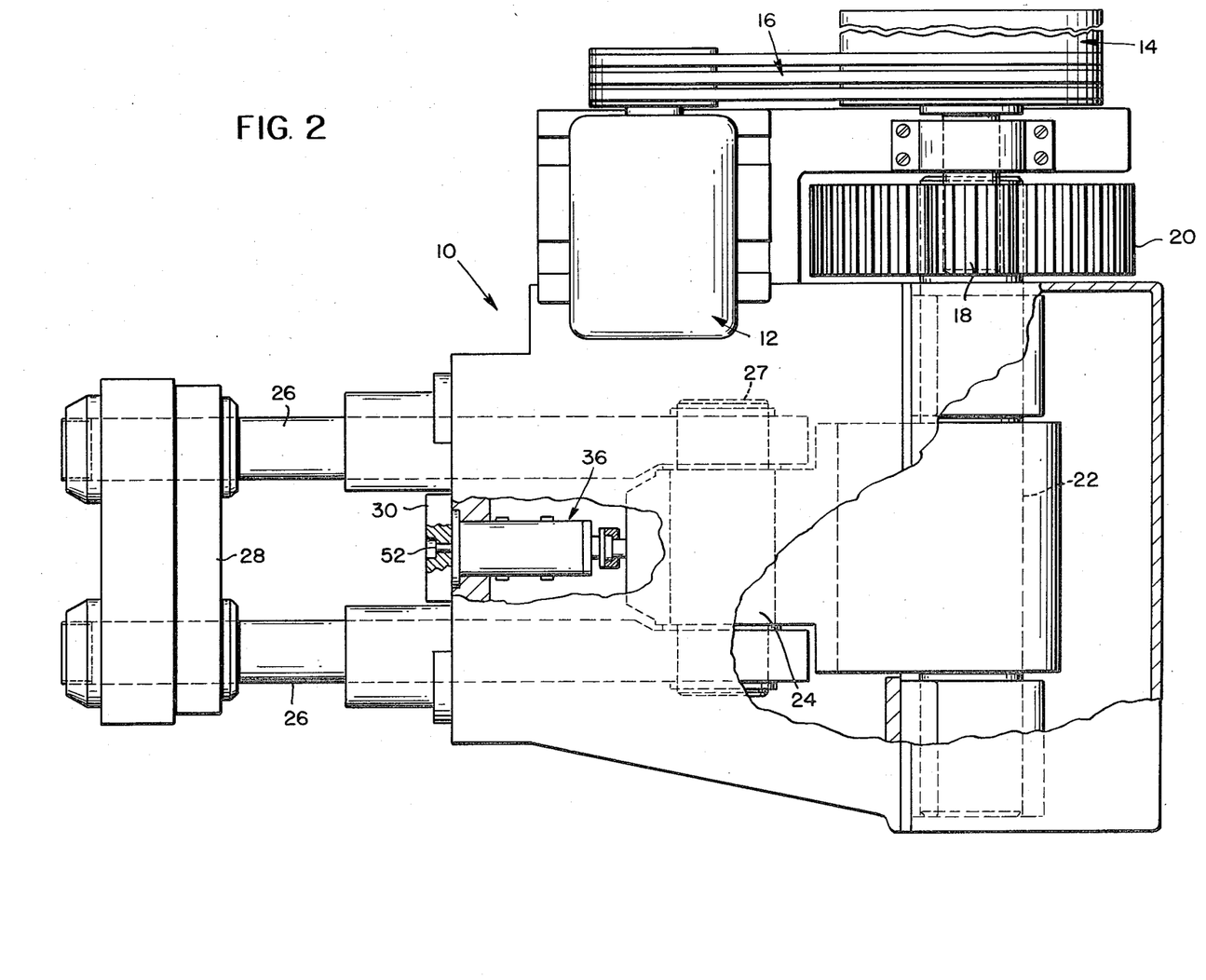
FIG. 2 is a top plan view of the machine of FIG. 1, showing the placement of the ejector assembly within a stationary portion of the machine.

FIGS. 1 and 2 illustrate a type of forming machine with which the improved ejector assembly of this invention may be used. The illustrated machine includes a base frame section 10 for supporting certain working components of the machine. In the illustrated embodiment a drive motor 12 is connected to a combination clutch and brake unit 14 (of the type shown, for example, in U. S. Pat. No. 3,614,999) by a plurality of drive belts 16 for imparting a rotary motion to a pinion gear 18 which is in meshing engagement with a larger gear 20. The larger gear 20 is a part of an eccentric drive mechanism which includes a rotating element 22 eccentrically carried for translating the rotary motion of the larger gear 20 into a reciprocal motion for a pair of draw rods 26. The draw rods are pivotally secured to a drive member 24 by a wrist pin 27, and the drive member 24 is reciprocated by the orbiting motion of the element 22 which is fitted into an opening formed through the drive member. The pair of draw rods 26 carry a ram 28 and an associated punch (illustrated in FIG. 9) which functions as a first forming means for the machine. A second forming means includes a bolster plate 30 and a die 32 which are mounted on a stationary portion of the machine base frame 10. A workpiece placed in the die 32 is formed and shaped when the first forming means reciprocates towards the fixed-position die so as to impart a blow to the workpiece. The machine which is illustrated is capable of delivering a force of up to 800 tons to a workpiece.

Figure 3:
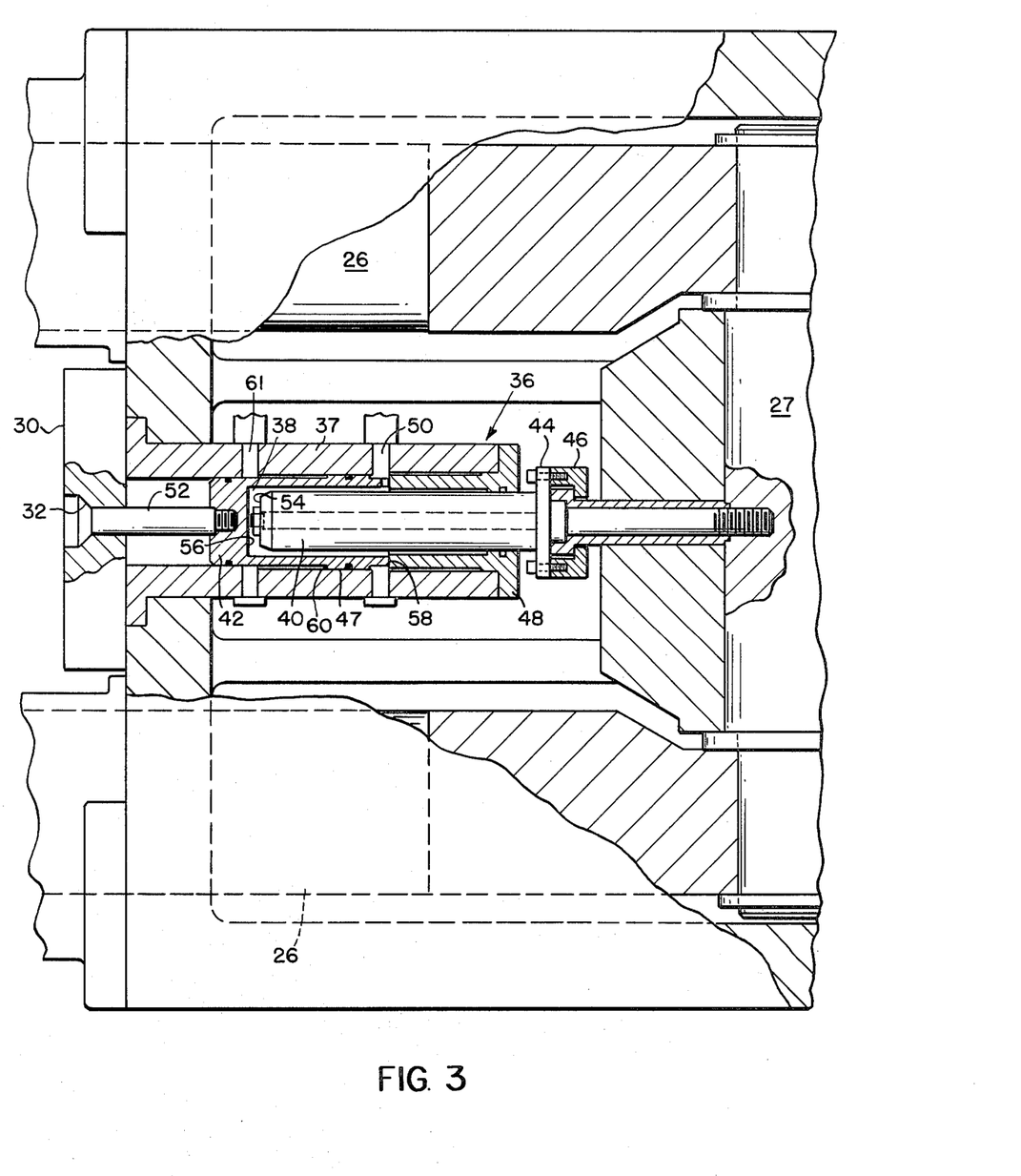
FIG. 3 is a top plan view, partly in section, showing the ejector assembly in greatly enlarged scale as it would appear in the placement shown in FIG. 2.

The ejector assembly of this invention is generally indicated at 36 in the FIG. 2 view, and details of the same assembly are shown in enlarged scale in the view of FIG. 3. It can be seen that the ejector assembly is held and positioned to apply an ejecting force to a workpiece from the opposite end of the die 32 from which a force from the first forming means is applied to the workpiece.

Considering the FIG. 3 orientation of the ejector assembly 36, it can be seen that moving components of the assembly are carried and supported within a cylindrical mounting sleeve 37 fitted within a bore formed in the machine housing. The assembly includes a hydraulic chamber means 38 (shown in its smallest volume condition at the end of an ejection cycle), a first ejector member 40 and a second ejector member 42. The first ejector member 40 is secured at its base to the wrist pin 27 of the machine, and therefore, all reciprocating motions of the basic drive mechanism of the machine are imparted to the first ejector member 40. Stated another way, the path and distance of travel of the ejector member 40 correspond to the forming and return strokes of the ram 28 of the machine. The first ejector member 40 is assembled with a mounting plate 44 and clamps 46 (including annular mounting sleeve 48) so that it can be easily removed and replaced by a different size or shape of ejector member if a different ejection characteristic is desired.

The second ejector member 42 is illustrated as comprising a hollow cylindrical structure having a forward closed end and a rearward open end for receiving the first ejector member 40 in sealed relationship thereto. An annular shoulder formation 47 is provided on an outside surface of the second ejector member 42 for being fitted within the bore of the mounting sleeve 37. This forms a sealed relationship between the second ejector member 42 and the mounting sleeve 37 and allows the ejector member to reciprocate within the mounting sleeve.

The hollow interior of the second ejector member 42 defines the hydraulic chamber means 38, nd it can be seen that the outside diameter of the first ejector member 40 is less than the inside diameter of the hydraulic chamber 38. The second ejector member 42 may be formed as a single cylindrical structure which is sufficiently long to enclose a free end of the first ejector member 40 for its full range of movement within the second ejector member 2 (as shown in FIGS. 4–7 for examples), but in the illustrated embodiment, the second ejector member 42 comprises a shorter cylindrical member which moves against a cylindrical end cap 48 to define a chamber means into which the first ejector member 40 may reciprocate. The end cap 48 is secured to the fixed structure of the machine and does not reciprocate with the reciprocating movements of the two ejector members 40 and 42.

Figure 8:
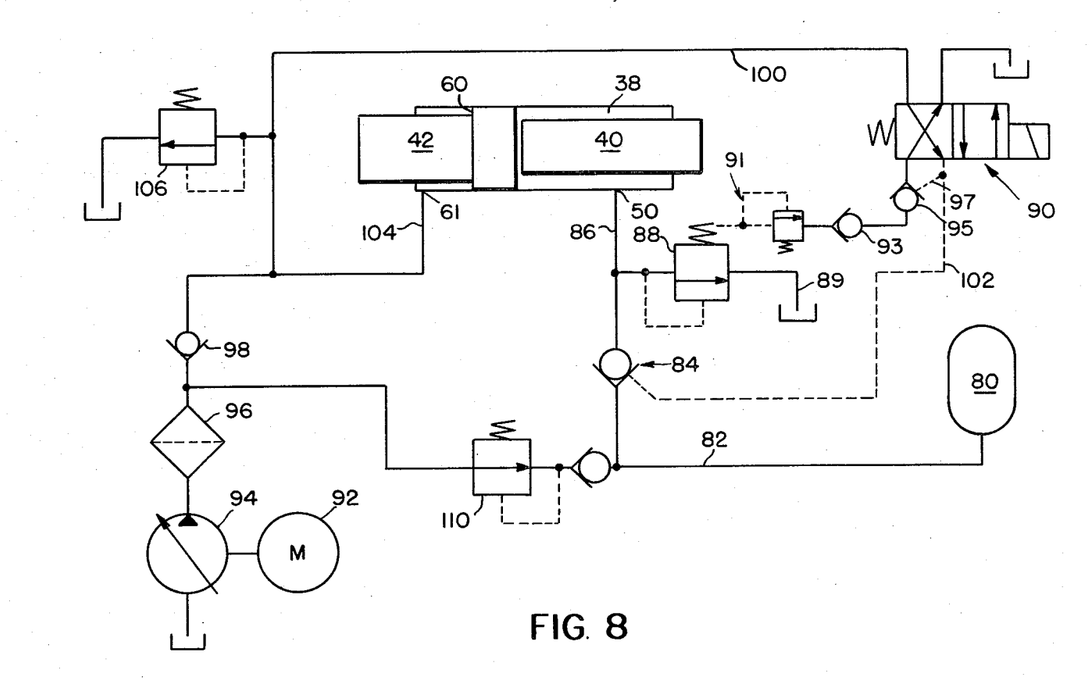
FIG. 8 schematically illustrates a hydraulic control circuit associated with the ejector mechanism of this invention.

Hydraulic fluid is supplied to the chamber means 38 from a suitable source, and a hydraulic control circuit is provided for controlling the flow of hydraulic fluid into and out of the chamber means 38. The hydraulic control circuit has been omitted from the FIG. 3 illustration, but is shown in schematic detail in FIG. 8. Basically, the hydraulic control circuit provides for a flow of hydraulic fluid into and out of the chamber means 38 by way of a port 50 (formed through the mounting sleeve 37 so as to form a communication past the end of the ejector member 42) to set prescribed volume and pressure conditions for the chamber means in accordance with a cycle of relative movements of the first and second ejector members. Details of the hydraulic control circuit will be discussed below with reference to the FIG. 8 illustration, and for present purposes it is sufficient to understand that the control circuit includes means for maintaining a fixed volume of hydraulic fluid within the chamber means 38 during a movement of the first forming means (the ram 28 and its punch) away from the second forming means (the die 32) so that advancement of the first ejector member 40 will result in an immediate movement of the second ejector member 42 in the direction of the workpiece, thereby initiating a separation and ejection of the workpiece by an ejecting pin or other device 52 carried at the free end of the second ejector means 42. A forward face of 54 of the first ejector member 40 defines a pressure reactive surface for that member as related to the volume of hydraulic fluid contained within the chamber means 38. An inner face 56 of the second ejector member 42 defines substantially all of its pressure reactive surface relative to hydraulic fluid within the chamber means 38, although an additional pressure reactive surface is developed at an annular end 58 (FIG. 3 embodiment) of the cylindrical structure from which the second ejector member 42 is formed as the second ejector member 42 moves toward a workpiece and away from the fixed-position end cap 48. Essentially, the total area of the pressure reactive surface 56 is about equal to the cross-section area of the cylinder within which the second ejector member is fitted. The total surface of the pressure reactive surface 54 is less than the total surface area of the pressure reactive surface 56, and this relationship provides for a differential rate of travel for the two ejector members, which will be discussed in greater detail below.

FIGS. 4–7 illustrate basic relationships between certain components of the ejector assembly of this invention at different stages of operation of the forming machine and the ejector assembly. The drawings are diagrammatic for purposes of clarity in illustrating the basic relationships, and it will be recognized that the illustrated dimensions are not intended to portray actual dimensions of a machine. Certain details have been omitted from the drawings. Also, the basic driving mechanism of the machine has been omitted from each of the views of FIGS. 4–7, but the illustrated wrist pin 27 is reciprocated back and forth in the manner described above with reference to FIGS. 1 and 2. It can be seen that the first ejector member 40 is secured directly to the wrist pin 27, and therefore, all reciprocating movements of the driving mechanism of the machine will be imparted directly to the first ejector member 40 as well as to the first forming means 28 (the ram and any punch or other forming device carried thereby) through the draw rods 26. Reciprocation of the first forming means 28 toward the right, in the FIG. 4–7 views, constitutes a forming stroke for the machine, and a reciprocation toward the left constitutes a return stroke during which time a workpiece W is separated and ejected from the second forming means 32 (a die or other forming fixture).

Figure 4:
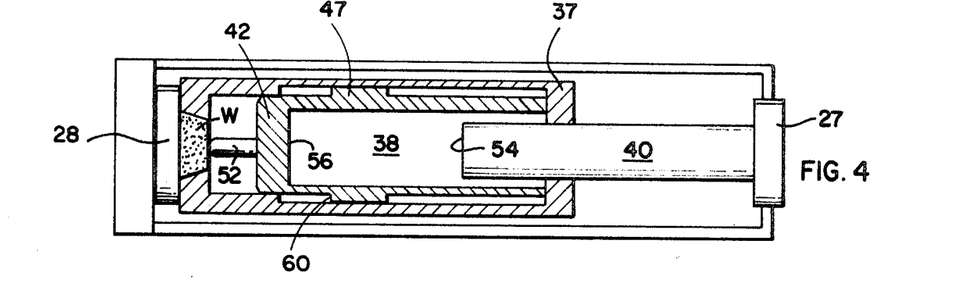
FIG. 4 is a diagrammatic view of basic components of the ejector assembly showing the relative positions of the components when the forming machine has completed a forming stroke and is ready to begin a return stroke which requires an ejection of a workpiece from the die of the machine.

FIG. 4 illustrates the condition of the machine when a forming stroke has been completed, and the first forming member 28 has been brought into full engagement with the workpiece W contained within the second forming means 32. In this position the first ejector member 40 is fully withdrawn from the chamber means 38, the chamber means 38 is filled with a volume of hydraulic fluid, and the second ejector member 42 is in a fully retracted position in readiness to eject the workpiece W during a return stroke of the machine.

Figure 5:
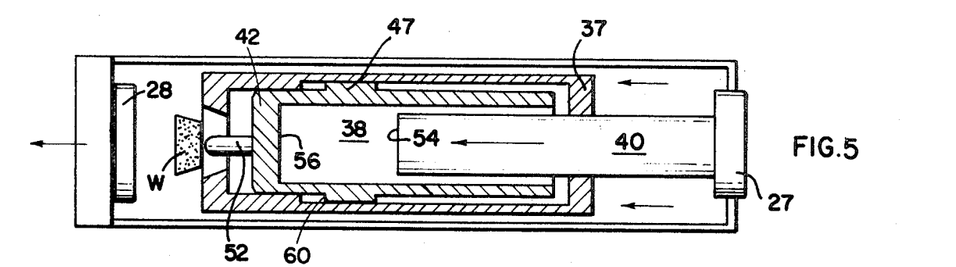
FIG. 5 is a view similar to FIG. 4, showing the relative positions of the ejector assembly components when a return stroke of the machine has been initiated and a workpiece is separated from the die.

FIG. 5 illustrates the condition of the machine after the first forming means 28 has started a return stroke dictated by a movement of the wrist pin 27 and the draw rods 26. The first ejector member 40 moves for an identical distance as the first forming means 28, and this movement is transmitted to the second ejector member 42 through the volume of hydraulic fluid contained within the chamber means 38. The volume of hydraulic fluid within the chamber means 38 is maintained at fixed level during the return stroke and ejection cycle of the machine by control means in a hydraulic control circuit which is not illustrated in the views of FIGS. 4–7. Since the area of the pressure reactive surface 54, of the first ejector member 40, is less than the area of the pressure reactive surface 56 (equal to cross-section area of internal bore within sleeve 37), of the second ejector member 42, a given distance of movement of the first ejector member 40 into the chamber means 38 will result in a shorter distance of movement of the second ejector member 42. Although the chamber means 38 is also moving by the fact that it is contained within the second ejector 42, the volume within the chamber 38 remains fixed during the entire return stroke of the machine, and this establishes a differential rate and distance of travel between the first and second ejector members.

By establishing a differential rate of travel between the first ejector member 40 and the second ejector member 42, it is possible to immediately initiate separation of a workpiece W from a die just as soon as the first forming means 28 breaks its contact with the workpiece W and is started on a return stroke away from the second forming means 32. If a differential rate of travel were not provided, an immediate separating of the workpiece W away from the second forming means 32 would result in a following of the workpiece W against the first forming means during its return stroke, thereby defeating an objective of obtaining immediate separation of the workpiece W from both forming surfaces simultaneously. Alternatively, it would be necessary to delay actual separation of the workpiece W from the second forming means 32 until the first forming means 28 were moved for a sufficient distance to provide clearance for ejection of the workpiece W. However, the arrangement of the present invention provides for immediate separation upon initiation of a return stroke of the machine, and this substantially reduces residence time of a hot workpiece W in a die or other fixture.

Figure 6:
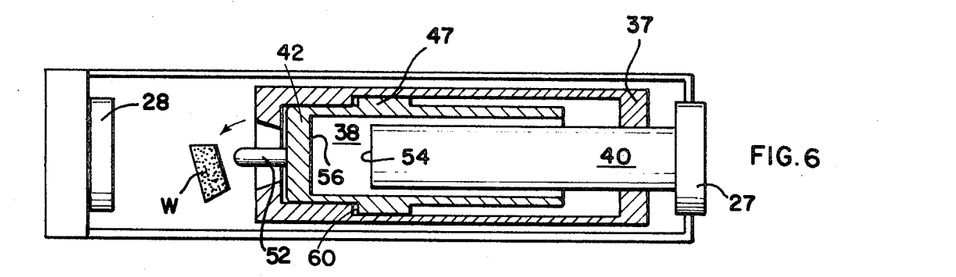
FIG. 6 is a view similar to FIGS. 4 and 5, showing completion of a return stroke of the machine and a complete ejection of a workpiece from the machine.

FIG. 6 illustrates the condition of the machine upon completion of a return stroke of the first forming means 28 to a limit position. Complete ejection of the workpiece W has been effected, and both the first and second ejector members 40 and 42 are in limit positions toward the left. During ejection, considerable force can be applied to the workpiece W by a build-up of pressure within the chamber means 38 as the first ejector member 40 continues its advancement into the chamber 38, and this assures an effective ejection under varying force requirements of the workpiece.

Figure 7:
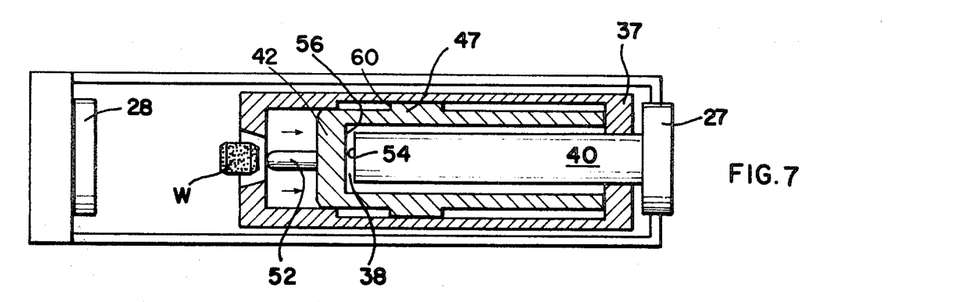
FIG. 7 corresponds to the views of FIGS. 4–6 and shows the machine in a reloaded condition and with a portion of the ejector assembly retracted for a subsequent forming stroke of the machine.

FIG. 7 illustrates a retraction of the second ejector member 42 away from the second forming means 32 so that a subsequent workpiece W can be loaded into the second forming means 32. Rapid retraction of the second ejector member 42 take place prior to initiation of a forming stroke of the machine, and this requires an adjustment in volume of hydraulic fluid contained within the chamber 38 so that the second ejector member 42 can rapidly retract without any corresponding movement of the first ejector member 40. This is accomplished by dumping hydraulic fluid from the chamber means 38 into a accumulator contained within the hydraulic control circuit (not shown), and simultaneously with this action, relatively high pressure hydraulic fluid is applied to an opposing pressure reactive surface 60 of the second ejector member 42 to drive the second ejector member 42 to its fully retracted position. Referring back to FIG. 3, it can be seen that the opposing pressure reactive surface 60 of the second ejector member 42 is defined by a face of the shoulder formation 47, and high pressure hydraulic fluid is applied thereto through a port 61 formed through the mounting sleeve 37.

After reaching the condition shown in FIG. 7, the machine is in readiness for a subsequent forming stroke which involves the rapid advancement of the first forming means 28 towards the second forming means 32 until the FIG. 4 condition is attained. During the forming stroke, the first ejector member 40 moves to the right while the second ejector member 42 remains in the position shown in FIG. 7, and this movement is used to refill the chamber means 38 with hydraulic fluid drawn from the accumulator contained within the associated hydraulic control circuit.

FIG. 8 schematically illustrates a hydraulic control circuit which is associated with the ejector assembly of this invention for controlling delivery of hydraulic fluid to and from the ejector assembly. In the FIG. 8 illustration, the first and second ejector members are illustrated in the same orientation as they appear in FIGS. 3–7, and conduits and other elements of the hydraulic control circuit are illustrated with lines and standard symbols. The positions of the two ejector members 40 and 42 correspond to those shown in FIG. 7 wherein the machine is in readiness for a forming stroke which results in a movement of the first ejector member 40 toward the right. This movement draws hydraulic fluid into the chamber means 38 from an accumulator 80 by way of a conduit 82, past a one-way check valve 84, and a conduit 86 leading to the inlet port 50 of the ejector assembly. The hydraulic fluid which is delivered to the chamber 38 is at a relatively low pressure of between about 50 psig and about 100 psig.

Once the ejector member 40 has reached a fully withdrawn position relative to the chamber means 38, it is ready for a return stroke toward the ejector member 42 which will transmit a differential rate of movement to the ejector member 42 as explained above with reference to FIGS. 4–6. During return movement (toward the left) of the ejector member 40, the check valve 84 prevents a reverse flow of hydraulic fluid out of the chamber 38, and this maintains a relatively fixed volume of fluid within the chamber during the complete ejection cycle. If the second ejector member 42 is unable to dislodge a workpiece from the die of the machine, a relief valve 88 is provided to release hydraulic fluid from the chamber 38 upon attainment of a relatively high pressure, on the order of 3,000 psig. Otherwise, pressure up to the relief valve amount will be applied to the second ejector member 42 to meet whatever resistance may be offered by a workpiece W being separated from a forming surface.

Upon completion of an ejection cycle, the ejector members 40 and 42 are in the relative positions shown in FIG. 6, and a solenoid valve 90 is switched to the position shown in FIG. 8 (having been in its alternate position during the ejection cycle) to provide for a rapid dumping of hydraulic fluid from the chamber means 38 back into the accumulator 80 to reset the ejector 42 back to a retracted position. Also, a portion of the fluid from chamber 38 is allowed to lead back to tank through conduit 89 when opened by vent control 91 which allows fluid to dump through the relief valve 88 at a relatively low pressure (about 125 – 150 psig to assure full recharging of the accumulator 80 prior to leaking of fluid back to tank). This leakage provides for a periodic circulation of fluid to prevent overheating. The vent control 91 includes a relief valve and a pair of check valves 93 and 95 for controlling the pressure level at which relief valve 88 is operated. Low pressure operation of relief valve 88 is established by an opening of check valve 95 with fluid pressure delivered through pilot conduit 97.

Resetting of the member 42 is accomplished with a separate higher pressure hydraulic circuit, operating at about 600 psig, which includes a motor 92, a pump 94 (which may be a vane pump), and a flow path which includes conduits passing through a filter 96, a one-way check valve 98, and a conduit 100 which passes through the solenoid valve 90 and into a pilot conduit 102 which applies a reverse pressure to the one-way check valve 84 to keep this check valve open. This allows an application of relatively high pressure fluid through the conduit 104 and the port 61 against the pressure reactive surface 60 of the second ejector member, resulting in a rapid retraction of the second ejector member and a simultaneous dumping of lower pressure hydraulic fluid from the chamber means 38 into the accumulator 80 and the tank as described above. A relief valve for the high pressure side of the circuit is provided at 106 to dump fluid from the circuit back to tank when a pressure of about 700 psig is developed in the high pressure circuit during an ejection stroke of the second ejector member 42.

Once the second ejector member 42 has retracted, the solenoid valve 90 can be moved to the left from the position illustrated in FIG. 8, and this allows the first ejector member 40 to draw hydraulic fluid from the accumulator 80 as the first ejector member 40 is withdrawn from the chamber means 38 during a forming stroke of the machine. Relief valve 110 is set to open at about 100 psig to assist in full recharging of the accumulator 80 from the high pressure circuit.

Thus, there is provided a relatively simple hydraulic control circuit for controlling all operations of the first and second ejector members 40 and 42 in the assembly of this invention.

Figure 9:
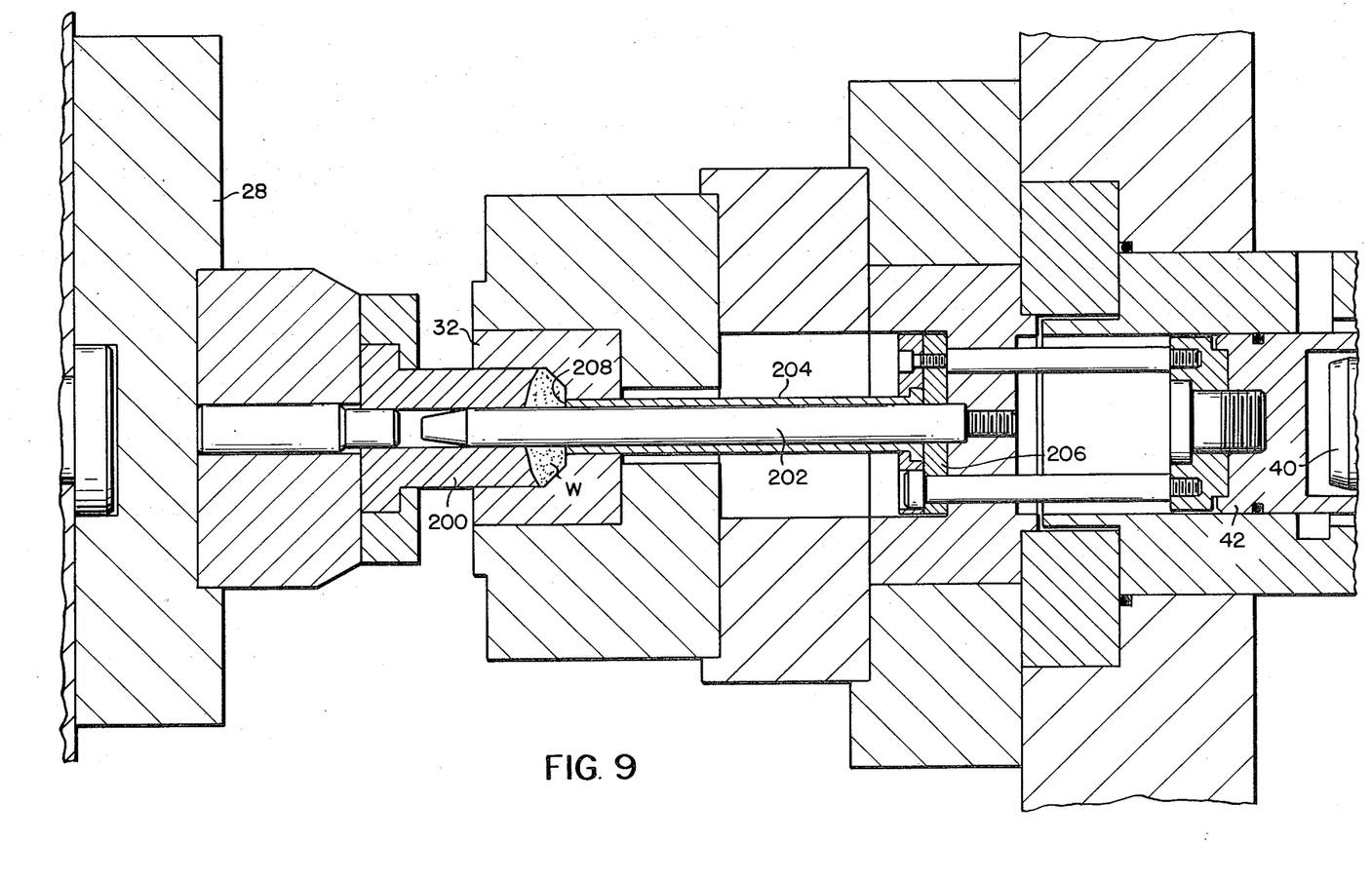
FIG. 9 illustrates a preferred ejector device for use in a machine which includes a core rod in its die for supporting a part.

FIG. 9 illustrates a preferred ejector device for use in a machine specifically designed for forming bevel gear shapes from powder metal compacts. The FIG. 9 illustration is not representative of actual relative positions between the ejector members 40 and 42 when a punch 200 is in enegagement with a die 32 inasmuch as the various elements of the machine have been compressed together to illustrate their design characteristics in the context of this invention.

The die 32 includes a core rod member 202 for supporting the workpiece W in a machine of the type shown in FIGS. 1 and 2 having a horizontal axis of movement. The core rod 202 is secured to a stationary portion of the machine and does not reciprocate with the reciprocating portions of the ejector assembly. the ejector assembly includes an ejector sleeve 204 secured to a frame 206 which is fastened to and moves with the second ejector member 42. In addition, a free end 208 of the ejector sleeve functions to define a portion of the bottom of the die 32 during a forming stroke so that the workpiece will be formed against a face of the free end 208 of the ejector sleeve. Upon completion of a forming stroke, the ejector members 40 and 42 begin their respective rates of travel toward the position of the workpiece W, and the ejector sleeve 204 applies an immediate force against the workpiece W. The workpiece W is separated from the die surfaces very rapidly by the advancement of the ejector sleeve 204, and the punch 200 moves away from the workpiece W at an even faster rate, thereby assuring complete separation of the workpiece W from both the forming surfaces as soon as the forming operation has been completed. Ultimately, the workpiece W is pushed off from or to the end of the core rod 202 and from where it is transferred to a collection station or conveyor with transfer apparatus. An equivalent arrangement would provide for a mounting of the core rod 202 on the center axis of the punch 200 for movement therewith, thereby providing a movement of the core rod out of the workpiece upon completion of a forming stroke.

Although the invention has been described with reference to a preferred embodiment, it can be appreciated that the principles and concepts of this invention apply to various types of forming machine requirements. Substitution of equivalent structures and functions for those described above are intended to be included within the scope of protection sought herein as defined in the claims which follow.

What is claimed is:

1. In a machine for forming or shaping a workpiece by imparting a force to the workpiece with a first forming means which is brought into engagement with the workpiece while the workpiece is held against a second forming means, the improvement comprising an ejector assembly which can be installed in said second forming means for rapidly separating and ejecting a workpiece from the second forming means in response to movement of the first forming means away from said second forming means, said ejector assembly including a chamber means for containing hydraulic fluid supplied from a source, a first ejector member in the form of a cylindrical member having a pressure reactive surface defined on an end thereof for exposure to hydraulic pressure within said chamber means and having a path of travel which corresponds to the distance and direction of travel of said first forming means relative to said second forming means, a second ejector member in the form of a hollow cylindrical member arranged for reciprocal movement relative to said second forming member and having a closed end defining a pressure reactive surface on the interior thereof for exposure to hydraulic pressure within said chamber means for responding to movement of said first ejector member only in a direction which corresponds to movement of said first forming means away from said second forming means, said first and second ejector members being designed and arranged with said first ejector member fitted for sealed, reciprocal movement within said second ejector member, said first ejector member having an external diameter less than the internal diameter of the hollow section of the second ejector member so that the pressure reactive surface area of the second ejector member is greater than the area of the pressure reactive surface of the first ejector member, with the pressure reactive surface of said first ejector member being carried within said second ejector member, and said second ejector member having means for contacting and moving a workpiece when the first forming means moves away from the second forming means, and a hydraulic control circuit means having a fluid flow communication with said chamber means and with a source of supply of hydraulic fluid, said control circuit means including means for maintaining a fixed volume of hydraulic fluid within said chamber means during a movement of said first forming means away from said second forming means, whereby said second ejector member will move at a lower rate and for a shorter distance than said first ejector member to separate and eject a workpiece from the second forming member as the first forming member moves away from the second forming member.

2. The improvement of claim 1 wherein said second ejector member is positioned between said first ejector member and said second forming means so that the first ejector member will be moved into the hollow section of said second ejector member as the first forming means is moved away from said second forming means.

3. The improvement of claim 1 wherein said first ejector member is operatively connected to a reciprocating portion of a driving mechanism of said machine so as to be mechanically linked to and timed with movements of said first forming means.

4. In a machine for forming or shaping a workpiece by imparting a force to the workpiece with a punch which is brought into engagement with the workpiece while the workpiece is held against a die, the improvement comprising a core rod means carried into said die for insertion into a workpiece having a bore therethrough, an ejector assembly which can be installed in said die for rapidly separating and ejecting a workpiece from the die in response to movement of the punch away from said die, said ejector assembly including a chamber means for containing hydraulic fluid supplied from a source, a first ejector member having a pressure reactive surface exposed to hydraulic pressure within said chamber means and having a path of travel which corresponds to the distance and direction of travel of said punch relative to said die, a second ejector member having a pressure reactive surface exposed to hydraulic pressure within said chamber means for responding to movement of said first ejector member only in a direction which corresponds to movement of said punch away from said die, the area of said pressure reactive surface of said second ejector member being greater than the area of the pressure reactive surface of said first ejector member, and said second ejector member having an ejector sleeve means receivable around said core rod means so as to reciprocate into and out of a cavity portion of said die in accordance with movements of the second ejector member to thereby contact and move a workpiece when the punch moves away from the die, and a hydraulic control circuit means having a fluid flow communication with said chamber means and with a source of supply of hydraulic fluid, said control circuit means including means for maintaining a fixed volume of hydraulic fluid within said chamber means during a movement of said punch away from said die, whereby said second ejector member will move at a slower rate and for a shorter distance than said first ejector member to separate and eject a workpiece from the die as the punch moves away from the die.

5. The improvement of claim 4 wherein a free end of said ejector sleeve defines at least a portion of the bottom of said die cavity portion when said ejector assembly is in a condition for a forming operation to take place.

6. In a machine for forming or shaping a workpiece by imparting a force to the workpiece with a first forming means which is brought into engagement with the workpiece while the workpiece is held against a second forming means, the improvement comprising an ejector assembly which can be installed in said second forming means for rapidly separating and ejecting a workpiece from the second forming means in response to movement of the first forming means away from said second forming means, said ejector assembly including a chamber means for containing hydraulic fluid supplied from a source, a first ejector member having a pressure reactive surface exposed to hydraulic pressure within said chamber means and having a path of travel which corresponds to the distance and direction of travel of said first forming means relative to said second forming means, a second ejector member having a pressure reactive surface exposed to hydraulic pressure within said chamber means for responding to movement of said first ejector member only in a direction which corresponds to movement of said first forming means away from said second forming means, the area of said pressure reactive surface of said second ejector member being greater than the pressure reactive surface of said first ejector member, and said second ejector member having means for contacting and moving a workpiece when the first forming means moves away from the second forming means, and a hydraulic control circuit means having a fluid flow communication with said chamber means and with a source of supply of hydraulic fluid, said control circuit means including means for maintaining a fixed volume of hydraulic fluid within said chamber means during a movement of said first forming means away from said second forming means, whereby said second ejector member will move at a slower rate and for a shorter distance than said first ejector member to separate and eject a workpiece from the second forming member as the first forming member moves away from the second forming member, and said hydraulic control circuit including a low pressure circuit for delivering relatively low pressure hydraulic fluid into and out of said hydraulic chamber in accordance with a sequence of relative movements between said first and second ejector members, said low pressure circuit having an accumulator means for (a) storing hydraulic fluid when the volume of said hydraulic chamber is reduced by relative movement between said first and second ejector members and (b) returning hydraulic fluid to said hydraulic chamber when its volume is increased by relative movement between first and second ejector members.

7. The improvement of claim 6 and including a second pressure reactive surface on said second ejector member, said second pressure reactive surface being in a position which is opposing to the direction of reaction of the first-named pressure reactive surface of the second ejector member, and further including a high pressure circuit for delivering relatively high pressure hydraulic fluid to said second pressure reactive surface for controlling retraction of the second ejector member upon completion of an ejection cycle.

8. The improvement of claim 7 wherein said high pressure circuit is in fluid flow communication with said low pressure circuit, and including valve means for regulating timed operations of said high and low pressure circuits.

9. The improvement of claim 8 and including control means for said hydraulic control circuit which provide for a cycle of operation for the ejector assembly which includes:

a forming position wherein said first ejector member is fully withdrawn from said chamber means and said first forming means is in a limit position for contacting and shaping a workpiece contained within said second forming means, a movement of the first forming means and the first ejector member at one rate of movement and a simultaneous movement of the second ejector member at a lesser rate of movement so as to apply an immediate ejecting force to the workpiece as the first forming means moves away from the workpiece and said second forming means, a movement of said first and second ejector members and said first forming means to limit positions at which a workpiece is completely ejected from the second forming means and the machine is made ready for reloading and application of a forming stroke to another workpiece, a rapid movement of said second ejector member, in response to high pressure hydraulic fluid of said high pressure circuit, to its retracted position so as to allow reloading of the second forming means prior to movement of said first forming means toward the second forming means, and a movement of said first forming means and said first ejector member in a direction which applies a force to a workpiece contained in the second forming means and which draws low pressure hydraulic fluid into said chamber means, to thereby return the ejector assembly to said starting position.

10. The improvement of claim 6 wherein said hydraulic control circuit includes means for periodically circulating hydraulic fluid to and from a reservoir to prevent overheating of the hydraulic fluid.

* * * * *

UNITED STATES PATENT OFFICE
CERTIFICATE OF CORRECTION

Patent No. 3,805,577          Dated  April 23, 1974

Inventor(s)  Werner E. Bergemann & William G. Buchanan

It is certified that error appears in the above-identified patent and that said Letters Patent are hereby corrected as shown below:

Column 5, line 23, change "2" to ---42---.
Column 8, line 54, change "lead" to ---leak---.
Column 11, line 3, change "lower" to ---slower---.

Signed and sealed this 10th day of September 1974.

(SEAL)
Attest:

McCOY M. BIBSON, JR.                C. MARSHALL DANN
Attesting Officer                   Commissioner of Patents